United States Patent

[11] 3,592,323

| [72] | Inventor | Edward E. Ross<br>San Rafael, Calif. |
|---|---|---|
| [21] | Appl. No. | 871,863 |
| [22] | Filed | Oct. 28, 1969 |
| [45] | Patented | July 13, 1971 |
| [73] | Assignee | Del Monte Corporation<br>San Francisco, Calif. |

[54] ARTICLE-HANDLING METHOD AND APPARATUS
15 Claims, 31 Drawing Figs.

[52] U.S. Cl. .................................. 198/76,
198/102, 198/212, 198/154, 214/16 B
[51] Int. Cl. .................................. B65g 37/00
[50] Field of Search .................................. 198/76,
154, 102, 212; 221/107, 108, 119, 120, 121, 133

[56] References Cited
UNITED STATES PATENTS

| 2,243,633 | 5/1941 | Jones | 198/76 |
|---|---|---|---|
| 3,034,517 | 5/1962 | Reiland | 221/120 X |
| 3,480,129 | 11/1969 | Tatibana | 302/2 |

*Primary Examiner*—Gerald M. Forlenza
*Assistant Examiner*—Jerold M. Forsberg
*Attorney*—Flehr, Hohbach, Test, Albritton & Herbert ABSTRACT: A method and apparatus for handling various articles that are of comparable size and where the articles are received at a nonuniform rate. Two (i.e. first and second) conveying means are employed with paths of movement through a common transfer and accumulator region. In this region the articles are transferred in a random fashion from pockets of the first to pockets of the second conveying means. The transfer takes place at such a rate that all of the pockets of the second conveying means leaving the transfer region are filled whereby the second conveying means supplies the articles at a constant rate. The transfer region also serves as an accumulator in that a substantial number of articles are maintained in this region, thus accommodating substantial changes in the rate of supply of articles by the first conveying means without affecting the desired uniform rate of supply by the second conveying means. The embodiments disclosed include an apparatus making use of conveyors of the endless chain type, and apparatus employing wheels or discs having article receiving pockets. Also, one disclosed embodiment combines the accumulator means for orienting the articles.

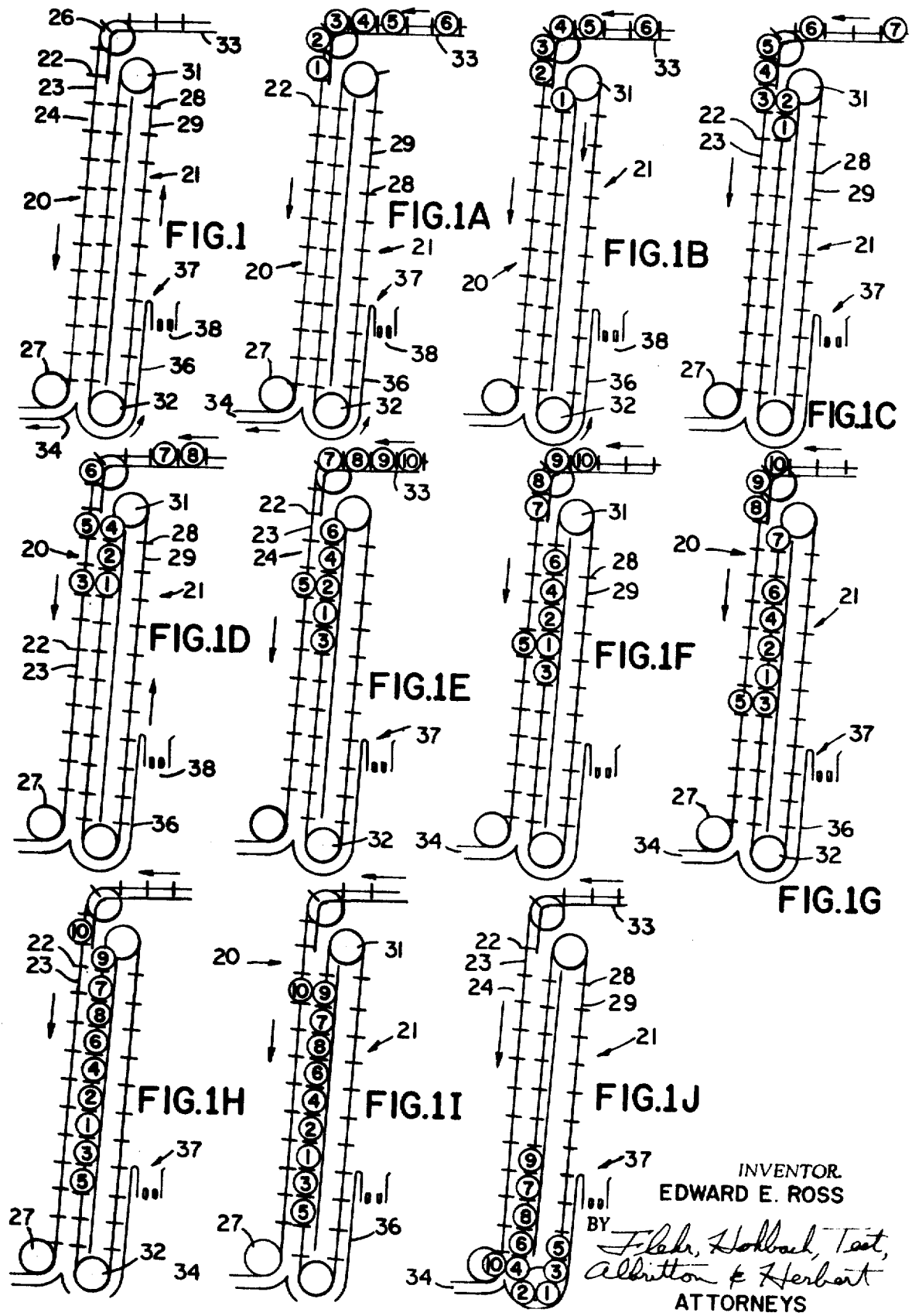

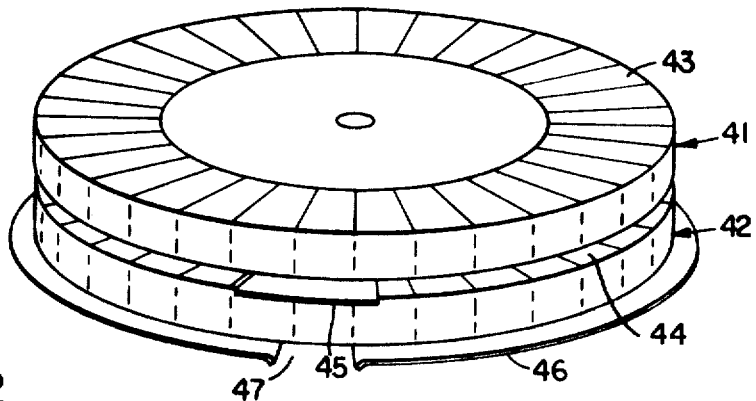
FIG_2
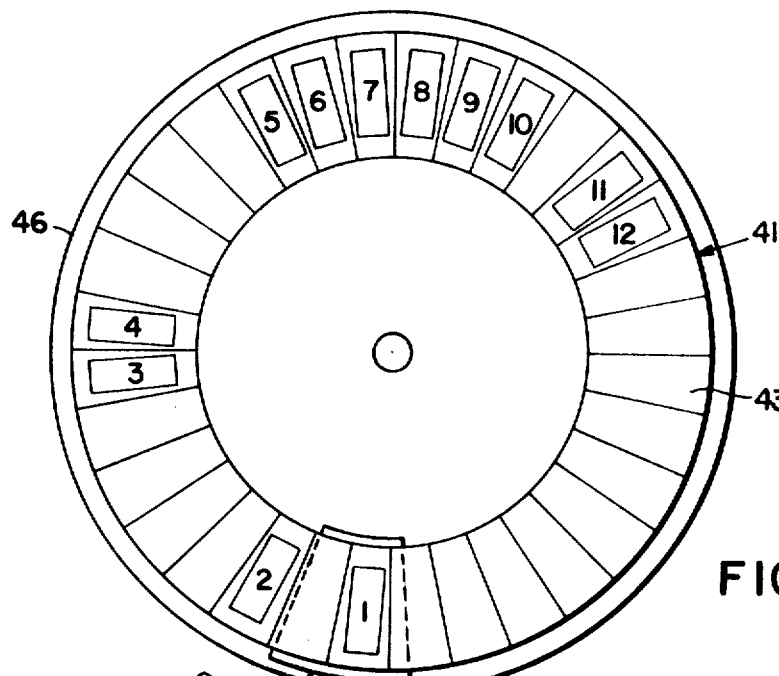
FIG_3
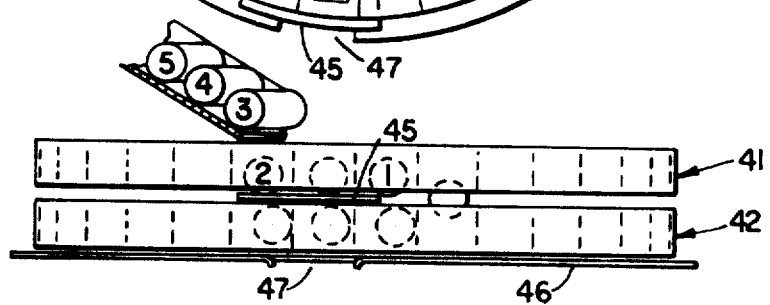
FIG_4
INVENTOR.
EDWARD E. ROSS
BY
Flehr, Hohbach, Test,
Albritton & Herbert
ATTORNEYS

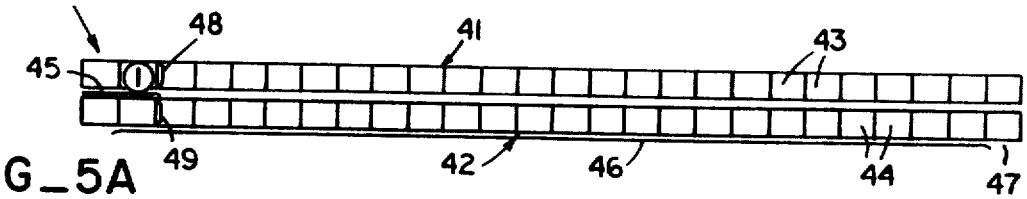
FIG_5A
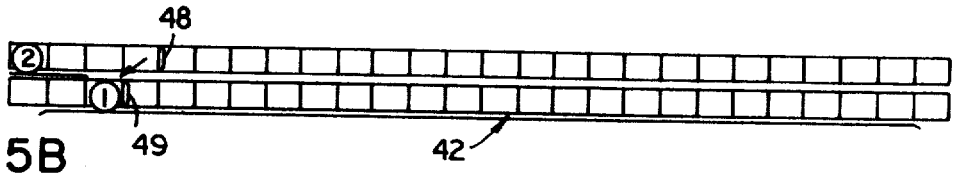
FIG_5B
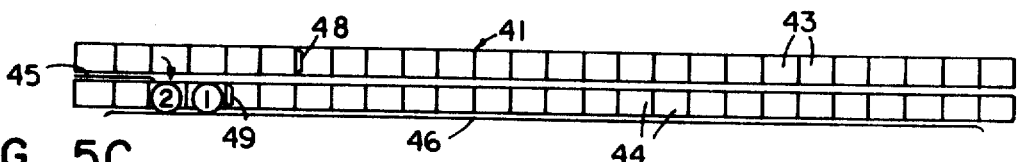
FIG_5C
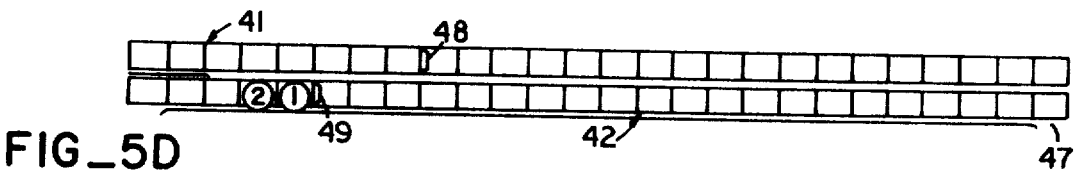
FIG_5D
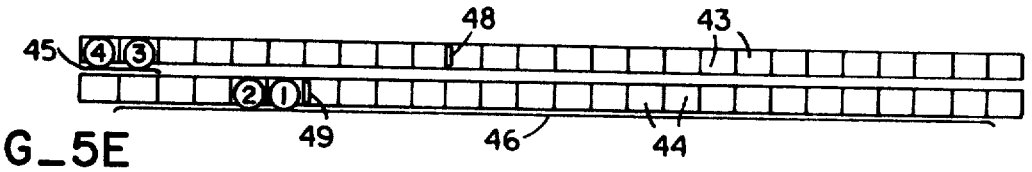
FIG_5E
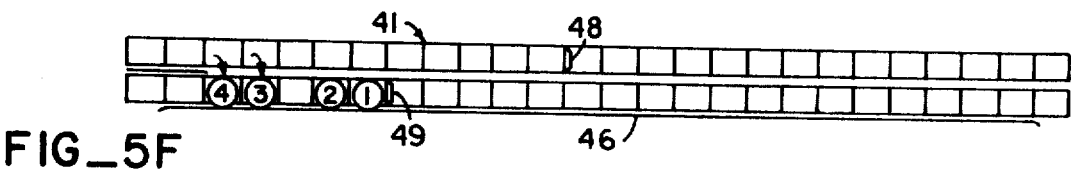
FIG_5F
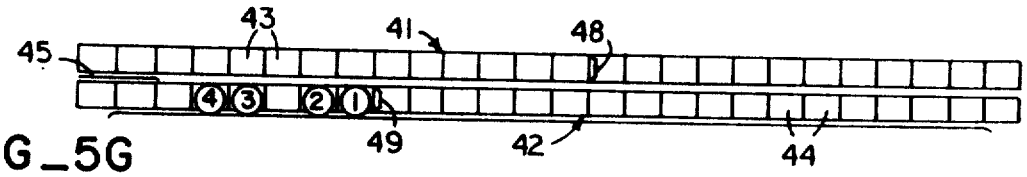
FIG_5G
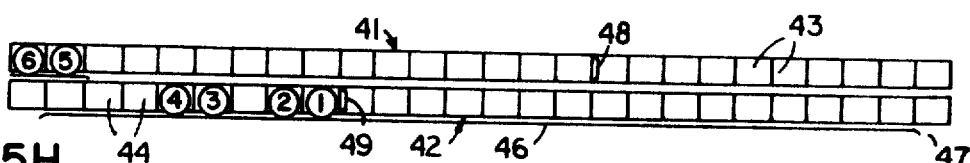
FIG_5H
*INVENTOR.*
EDWARD E. ROSS
BY
ATTORNEYS

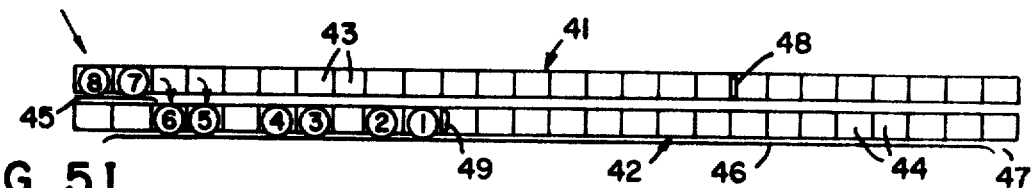
FIG_5I
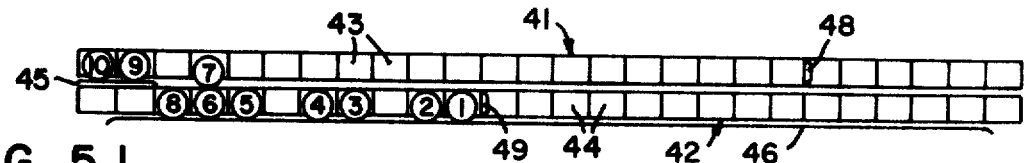
FIG_5J
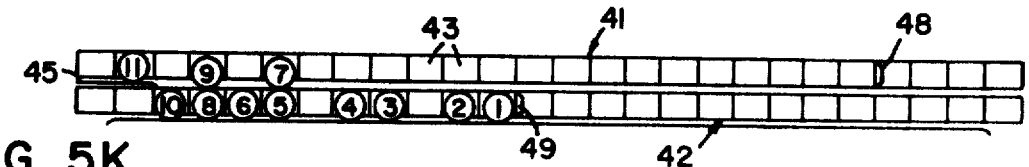
FIG_5K
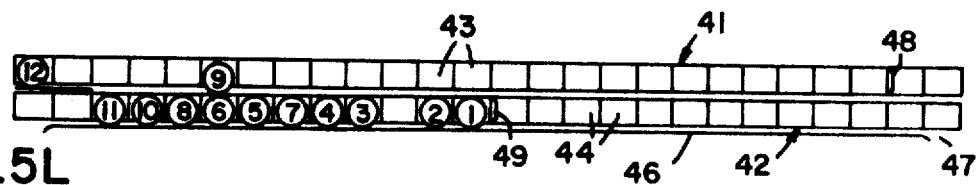
FIG_5L
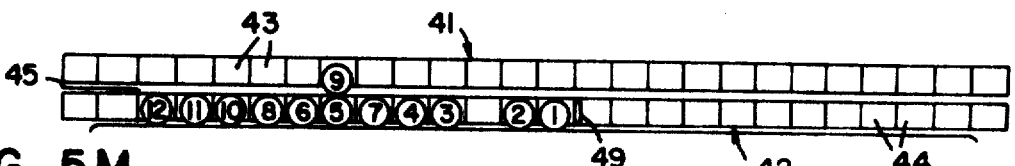
FIG_5M
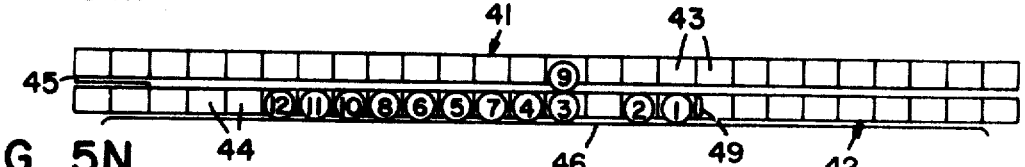
FIG_5N
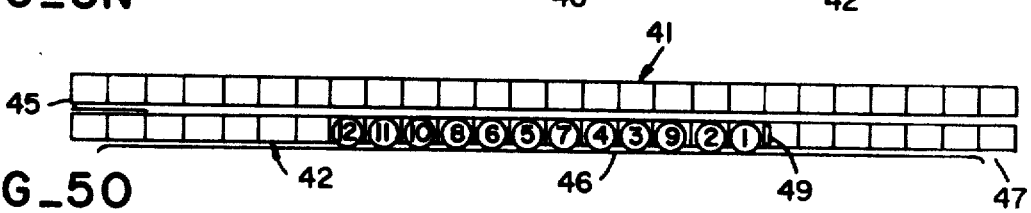
FIG_5O
*INVENTOR.*
EDWARD E. ROSS
BY
ATTORNEYS

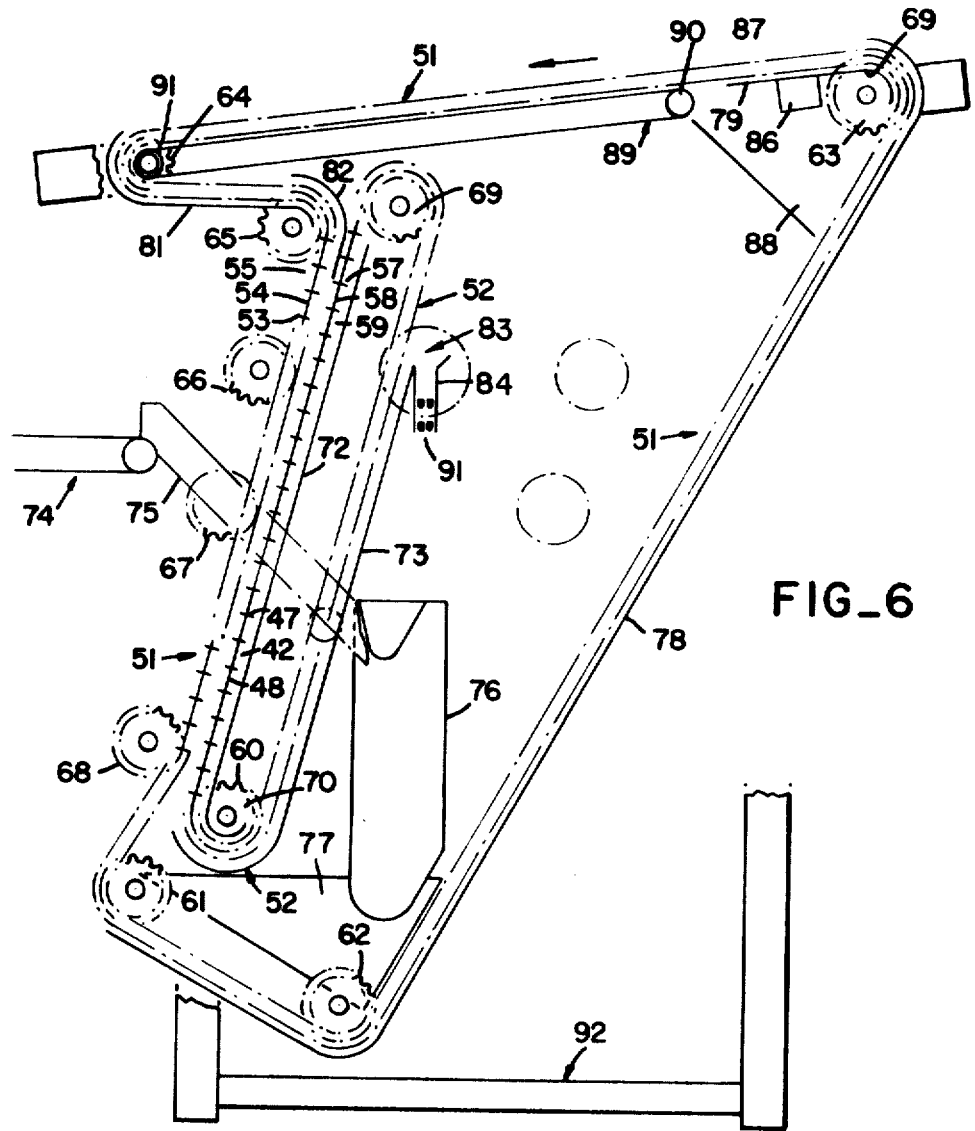
FIG_6
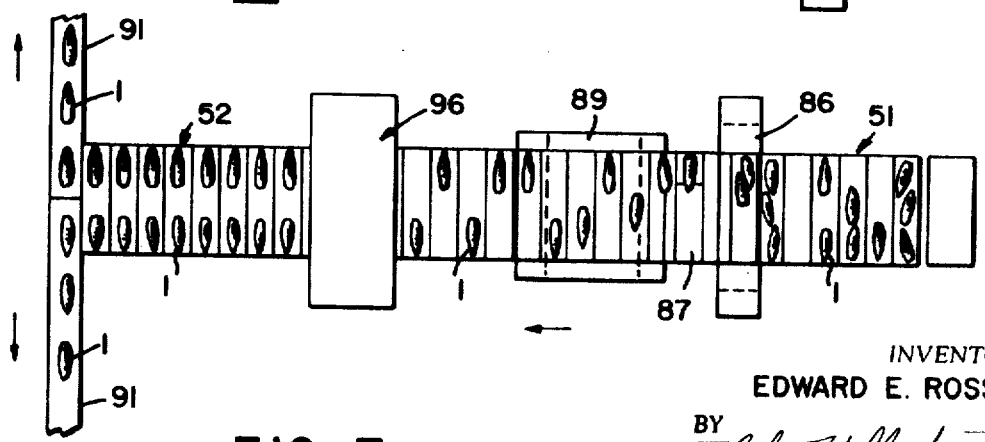
FIG_7
INVENTOR.
EDWARD E. ROSS
ATTORNEYS

ARTICLE-HANDLING METHOD AND APPARATUS

BACKGROUND OF THE INVENTION

This invention relates generally to methods and apparatus for the handling of various articles. More particularly it pertains to handling methods and apparatus adapted to supply articles at a uniform rate where the articles are received at a rate which is not uniform. It further relates to methods and apparatus which perform an orienting function, together with a transfer function that provides for the supply of oriented articles at a uniform rate.

In many plant operations making use of conveying equipment (e.g., endless chain or belt conveyors), the articles being handled are received at a nonuniform rate. Therefore, a conveyor receiving such articles will normally deliver them at a nonuniform rate. Assuming that the articles are to be delivered to a processing machine, it is desirable to provide means whereby the articles are fed to the machine at a uniform rate. This permits economical operation of the processing machine at its maximum rated capacity. Although methods and apparatus for accomplishing this purpose have been proposed, they have not been satisfactory for several reasons. For example, rotary table accumulators have been used between incoming and outgoing conveyors, the arrangement being such that although articles are received at a nonuniform rate on the table, they are supplied by the table at a uniform rate to an outgoing conveyor. This type of accumulator has been employed mainly for standing articles such as jars, cans, and bottles. Operation of such equipment causes considerable surface abrasion due to rubbing of the articles against each other and sliding over supporting and surfaces. Also such equipment is relatively complicated, and as previously indicated, cannot be readily adapted for a wide variety of articles ranging from products that are susceptible to physical injury, such as husked sweet corn ears, to items that are more rugged, such as cans, jars or bottles.

The article-handling problems referred to above exist in many plant systems and article handling equipment. Particular reference can be made to equipment for the orienting of tapered articles, where an orienting operation positions the articles in two discontinuous rows (e.g., see U.S. Pat. No. 3,394,805). It will be evident that such rows afford a nonuniform rate of delivery to further processing equipment.

SUMMARY OF THE INVENTION AND OBJECTS

It is an object of the invention to provide a method and apparatus of the above character which supplies articles at a uniform rate, although the articles are received at a rate which is not uniform.

It is a further object of the invention to provide a method and apparatus of the above character which provides an accumulating function, particularly in that a plurality of articles are retained in a transfer zone to insure delivery of the articles at a uniform rate.

Another object of the invention is to provide a method and apparatus of the above character which is relatively simple in its construction and method of operation, and which will no cause physical injury of the articles being handled.

A further object of the invention is to provide an apparatus and method making use of two conveyor means, one which receives articles at a nonuniform rate, and a second which supplies the articles at a uniform rate. The invention is characterized by the fact that the two conveying means operate through a transfer region where articles from the first conveying means are transferred to pockets of the second conveying means in a random fashion.

Another object of the invention is to provide a method and apparatus which is applicable to a wide variety of articles, including agricultural products such as corn, carrots, pineapples, pears, and the like, and products such as cans, glass jars, bottles, plastic containers and the like.

A further object is to provide apparatus which orients the articles into two discontinuous rows and which transfers the articles of the two rows in such a manner as to deliver the articles in two continuous rows at a uniform rate.

In general, the present invention makes use of first and second conveying means, each having a plurality of successive pockets, and with each pocket adapted to accommodate an article of the type being handled. The two conveying means have paths of movement which are in juxtaposition in a transfer region. Articles are supplied to the pockets of the first conveying means at a nonuniform rate whereby some but not all of such pockets contain articles. Articles from the first conveying means are transferred in a random fashion to pockets in the second conveying means in the transfer region, the rate of transfer being such that each of the pockets of the second conveying means in the transfer region is supplied with an article. The transfer of articles takes place at various points and in a random fashion along the paths of movement of the conveying means in the transfer region. The progression of the pockets in the conveying means through the transfer region is concurrent, with the pockets of the first conveying means moving at a speed greater than the pockets of the second means. One disclosed embodiment also has orienting means which orient the articles into at least two rows before they move into the transfer region.

BRIEF DESCRIPTION OF THE DRAWING

FIG. 1 is a schematic side elevational view showing one form of apparatus for carrying out the invention;

FIGS. 1A—1J inclusive schematically illustrate the apparatus of FIG. 1 handling articles numbered 1—10 inclusive, for various relative positions of the two conveyors;

FIG. 2 is a perspective view schematically illustrating another type of apparatus in which articles are disposed in radially extending pockets provided in discs;

FIG. 3 is a plan view of the apparatus shown in FIG. 1 with articles 1—12 inclusive disposed in the pockets of the upper disc;

FIG. 4 is a side elevational view of the apparatus shown in FIG. 2;

FIGS. 5A—5O inclusive are developments schematically illustrating operation of the apparatus shown in FIGS. 2—4 for different relative positions between the upper and lower discs;

FIG. 6 is a side elevational view showing another embodiment of the invention in which an orienting operation is carried out;

FIG. 7 is a schematic plan view illustrating the orienting operations carried out with the apparatus of FIG. 6.

DESCRIPTION OF THE PREFERRED EMBODIMENTS

As previously stated, the present invention makes use of two conveying means (i.e., first and second conveyors) with articles or items received by the first conveying means being transferred to the second conveying means through a transfer region. Each conveying means is constructed to provide a plurality of article-receiving pockets, and in the transfer region articles from the pockets of the first conveying means are transferred into unoccupied or vacant pockets of the second conveying means.

The apparatus schematically illustrated in FIG. 1 consists of first conveying means 20 and second conveying means 21. It is assumed that both conveying means are of the endless chain or belt type, with their length and disposition depending upon particular requirements. Each conveying means is constructed in such a manner as to provide a plurality of article-receiving pockets. Thus, the first conveying means 20 can consist of spaced parallel slats or flights 22 having their ends attached to side chains indicated schematically at 23. The spacing between the flights forms laterally extending pockets 24 which are dimensioned to accommodate the articles being handled. The two side chains of the conveyor 20 are shown engaging the sprockets 26 and 27.

The conveying means 21 can be of the same general construction as the means 20. As schematically illustrated, it consists of spaced parallel flights or slats 28 attached at their ends to chains 29, the chains in turn, engaging the indicated sprockets 31 and 32. That portion of the conveying means 20 extending between the sprockets 26 and 27 is shown generally upright but at an angle to the vertical. A portion of the conveying means 20 is in juxtaposition with the inclined portion of the conveying means 21. These two adjacent portions extend through what can be referred to as the accumulating and transfer region. It is within this region that articles are transferred from one conveying means to the other.

With respect to conveying means 20, the articles remain within the pockets between the flights until the conveying means reaches the transfer region. For this purpose a retaining plate 33 is shown underlying the path of movement of the flights, the plate terminating at the upper end of the transfer region. A similar plate 34 underlies the flights of the conveyor 20 for the lower outgoing portion, this plate commencing at the lower end of the transfer retion and extending below the corresponding run of the conveyor. The conveying means 21 has a similar plate 36 which commences in the lower portion of the transfer region and extends upwardly to the point of discharge 37.

Suitable drive means (not shown) is provided for driving both the conveyors 20 and 21. This drive means may connect with one or the other of sprockets 26 or 27, or with some other sprocket which engages the conveyor chains. Similarly, the conveyor 21 is driven by suitable means such as a drive connection to either one of the sprockets 31 or 32. The drive means is such that the first conveyor 20 is moved at a speed substantially greater than the speed of movement of the conveyor 21. By way of example, the conveyor 20 may be moved at a speed corresponding to 260 flights per minute, and the conveyor 21 at a speed corresponding to 130 flights per minute. Likewise, as indicated by the arrows, the two conveyors are caused to move concurrently through the transfer zone. The upper incoming portion of the conveyor 20 receives articles at a nonuniform rate whereby some of the pockets are vacant. The lower portion of the conveyor 21 leaving the transfer zone has all of its pockets filled with articles whereby the articles are delivered at a uniform rate at the point 37.

The method and mode of operation are shown in schematic FIGS. 1A—1J inclusive. It is assumed that conveyor 20 is moving at twice the speed of conveyor 21. In FIG. 1A, the articles 1, 2, 3, 4, 5 and 6 are shown being carried between the flights of the conveyor 20, with one pocket between the articles 5 and 6 vacant. The article 1 is moving down into the upper part of the transfer region, but is being retained by the adjacent plate 33.

FIG. 1B represents further movement of the conveyor 20 to cause the article 1 to clear the guide plate 23, whereby it moves under gravity into an adjacent empty pocket of the conveyor 21. Such movement is permitted only when the pocket in which article 1 is first located comes into registration with the vacant pocket to which it is transferred.

FIG. 1C represents the location of the articles, including an additional article 7, after a time interval during which article 1 has been moved downwardly, article 2 transferred to a registering pocket of conveyor 21, and article 3 has been brought to a position where it is alongside article 2. At this time article 3 cannot be transferred into an adjacent pocket because the adjacent pocket is already occupied by article 2.

FIG. 1D represents the location of the articles after a further interval, during which an additional article 8 is advancing toward the transfer region. Article 3 has moved down alongside article 1, whereby it is still restrained from moving into a pocket by article 1 of the conveyor 21. However, article 4 has been transferred into conveyor 21, and an additional article 5 has been moved to a position alongside of article 4. After a further interval, the articles are positioned as in FIG. 1E. Additional articles 9 and 10 are being advanced by the conveyor 20. Article 3 has been transferred into a pocket immediately in advance of article 1. Article 5 is now located alongside article 2. Article 6 has been transferred to a position immediately above article 4.

After a further interval, the articles are as shown in FIG. 1F. Article 5 has been moved downwardly alongside article 1, and articles 7 and 8 are advancing for transfer.

As shown in FIG. 1G, after a further interval, item 7 has been transferred to conveyor 21, and item 5 has advanced to a position alongside item 3. After a further interval as shown in FIG. 1H, item 9 has been transferred immediately above item 7, and item 5 has been transferred to a position immediately below item 3.

As shown in FIG. 2I, after another time interval article 10 has been moved to a position alongside article 9, and is moving downwardly to seek an empty pocket in conveyor 21. As shown in FIG. 1J, article 10 has moved downwardly to the sprockets 27 without having found an empty pocket, and therefore this article is either discharged as excess, or is carried away by the conveyor 20. If immediately after the items are positioned as shown in FIG. 1J, articles are again supplied by the incoming portion of the conveyor 20, they are again transferred somewhat in the random manner previously described whereby all of the pockets of the conveyor 21 are maintained filled for that portion of this conveyor leaving the transfer zone. This means, in effect, that during normal operation the articles are delivered at point 37 at a uniform rate, irrespective of the lack of uniformity with respect to the supply of articles by the conveyor 20. The articles delivered at point 37 can be arranged to drop upon a laterally extending conveyor 38 which may deliver the articles one after the other to a further processing machine.

It will be evident from the foregoing that in the transfer region the articles are transferred from pockets of the conveyor 20 to unoccupied pockets of conveyor 21 in a random fashion. In other words, the sequence with which the articles are advanced into the transfer region by the conveyor 20 is not maintained in the transfer of the articles into unoccupied pockets of the conveyor 21. Thus, there is a rearrangement of the order of sequence, due to the fact that an incoming article seeks a vacant pocket, and this pocket may be found above or below the last article transferred to the conveyor 21. It is also an inherent characteristic of the apparatus and method that a number of articles are accumulated in the transfer zone, thus making possible an interruption in the supply of articles by the conveyor 20 for a substantial time interval, without causing an interruption in the uniform delivery of articles by the conveyor 21. The capacity of the accumulator is dependent upon the number of pockets of the conveyor 21 which are in the transfer zone. In other words, for conveyors having a given number of pockets per lineal foot, the capacity as an accumulator can be increased by increasing the length of the transfer region.

In the foregoing, the conveying means is of the endless belt or chain type. Other types of conveying devices can be employed, provided pockets are formed and arranged for transfer of the articles from one fast moving to a slower moving conveyor. Thus, as schematically illustrated in FIGS. 2—4, the conveying means are in the form of upper and lower wheels or discs 41 and 42. These discs are disposed on a common vertical axis and are adapted to be driven whereby the upper disc is is rotated faster than the lower disc. The upper disc is shown provided with the radially extending pockets 43, and the lower disc has similar pockets 44. Articles are introduced into the pockets 43 of disc 41 at a nonuniform rate, either manually or by suitable feed means 45. A plate 45 underlies disc 41 in the feed zone and serves to retain the articles until they are permitted to drop into pockets of the lower disc. Another plate 46 is shown underlying the disc 42 and serves to retain the articles in the pockets 44 until such pockets reach the discharge point 47. FIG. 4 illustrates how articles may be introduced into the pockets of the upper disc 41 at a nonuniform rate and transferred from pockets of the upper to vacant pockets of the lower disc. Certain dividing walls 48 and 49 have been earmarked to show the extent of movements from one figure to the next.

FIGS. 5A to 5O inclusive are developments which schematically illustrate how articles numbered 1—12 inclusive are transferred from the upper to the lower disc. FIG. 5A shows article 1 in a pocket of the upper disc and about to be moved to a position where it may drop downwardly beyond the plate 45. FIG. 5B illustrates a further movement in which article 1 has dropped down into a registering pocket of the lower disc, and article 2 is being advanced. FIG. 5C illustrates articles 1 and 2 in adjacent pockets in the lower disc. FIG. 5D represents further movement of the two discs, with a vacant pocket appearing immediately behind the pocket occupied by article 2.

FIG. 5E represents further advancing of articles 1 and 2, with articles 3 and 4 being moved forwardly by the upper disc. FIG. 5F shows articles 3 and 4 having been deposited into pockets of the lower disc, but leaving a vacant pocket between articles 2 and 3.

FIG. 5G represents further advancing of the discs, but without an additional article being advanced by the upper disc. FIG. 8 shows further advancement of the discs with articles 5 and 6 being advanced.

FIG. 5I shows articles 5 and 6 having been deposited into pockets of the lower disc, leaving a vacant pocket between articles 4 and 5. Also it shows articles 7 and 8 being advanced by the upper disc.

FIG. 5J shows item 8 being deposited in a pocket immediately behind item 6, and also shows items 7, 9 and 10 in the upper disc. FIG. 5K shows items 7, 9 and 11 in the upper disc and shows article 10 in the lower disc immediately behind article 8. FIG. 5L shows articles 9 and 12 in pockets of the upper disc, with item 7 having been transferred to the pocket intervening between articles 4 and 5. Articles 9 and 12 are within the upper disc. FIG. 5M shows transfer of article 12 to the lower disc, with article 9 still remaining in the upper disc. FIG. 5N shows article 9 being advanced toward the vacant pocket between the articles 2 and 3 in the lower disc. FIG. 5O shows transfer of the article 9 into the vacant pocket between the articles 2 and 3. Beyond this position, the lower disc may permit the discharge of the items at a uniform rate beyond the edge of the underlying plate 46.

FIG. 6 illustrates another embodiment of the invention making use of conveying means of the endless belt or chain type. Also the machine in this instance is intended for the handling of elongated agricultural products which are tapered, such as husked corn, carrots and the like. The machine makes use of orienting means incorporated in connection with the upper run of the conveying means, and in general incorporates the invention disclosed and claimed in Patent No. 3,394,805. The first of the two conveyors is designated 51, and the second as 52. The conveyor 51 consists of the slats or flights 53 secured at their ends to the endless chains 54, the spaces 55 between the flights forming article receiving pockets. The conveyor 52 similarly consists of the parallel flights 57 which are secured at their ends to the side chains 58, and which are spaced apart to form similar article-receiving pockets 59. The first conveyor 51 is entrained over a plurality of sprockets 61 to 65 inclusive. Also the run of the conveyor between the sprockets 65 and 61 may be engaged by the idler sprockets 66, 67 and 68. The upper and lower ends of the conveyor 52 engage the sprockets 69 and 70, the arrangement being such that the one run of the conveyor 52 is in close proximity with the run of the conveyor 51 between the sprockets 69 and 70. Also this run of the conveyor 52 operates over the guide plate 72, whereby articles in the pockets of the conveyor 52 are retained within the same. Another retaining plate 73 is provided for the other run of the conveyor 52, and this plate is shown extending about the region of the sprocket 70. The end of a belt conveyor 74 is shown for supplying articles to the machine. This conveyor discharges into the side chute 75, which in turn delivers the articles to duct 76 and from thence to the hopper 77. This hopper serves to return the articles into the pockets of the conveyor 51, and particularly to the pockets of that portion of conveyor 51 extending between the sprockets 62 and 63. Both the run of the conveyor 51 between the sprockets 61 and 62, and that portion between sprockets 62 and 63 are provided with the guide plate 78 which serves to retain the articles within the conveyor pockets. In the vicinity of sprockets 63 the conveyor is also provided with the underlying guide plate 79. A similar guide plate 81 is provided for that run of the conveyor 51 between sprockets 64 and 65. Also a guide plate 82 surrounds a portion of the sprocket 65 and has a depending portion extending downwardly between the slights of the runs of the two conveyors which extend between sprockets 65 and 68.

The transfer region between the two conveyors is that region extending between the sprockets 65 and 68. Within this region the articles are transferred in a random fashion from conveyor 51 to conveyor 52.

The upper run of the conveyor 51 extending between the sprockets 63 and 64 may cooperate with means serving to perform an orienting operation on elongated tapered agricultural products such as fresh sweet cornears. Thus orienting means can be provided as disclosed in Ross et al. U.S. Pat. No. 3,394,805, which serves to move the ears into one side row and then move them in the directions of their smallest ends, whereby the ears of like orientation are aligned in two rows on the opposite sides of the conveyor. The means indicated for this purpose consists of a laterally extending endless belt 86, having its upper runs exposed through an opening in the guide plate 79. When ears of corn are moved by the conveyor 51 over the upper run of the endless belt 86, they are engaged and moved to one side of the conveyor in the manner described in FIG. 7 of said U.S. Pat. No. 3,394,805. This cross conveyor 86 corresponds generally to the belt conveyor 25 of said patent. If more than one ear is in a pocket the excess ear or ears are removed through the drop out opening 87 to fall into the return hopper 88. Another part of the orienting means illustrated consists of the endless belt 89 carried by the sprockets 90 and 91. The upper run of the belt 89 directly underlies that portion of the conveyor 51 extending between the sprockets 63 and 64. The belt 89 is driven in the direction indicated whereby its upper run moves in a direction opposite to the direction of movement of the conveyor 51. When tapered articles such as husked ears of sweet corn are moved over the belt 89, the ears are caused to rotate or spin whereby each ear is moved in the direction of its smaller end. This causes the ears to be aligned in two rows extending along the sides of the conveyor 51. Belt 89 corresponds to the belt 89 described in said U.S. Pat. No. 3,394,805.

Various takeoff means can be provided for removing articles at uniform rates from the second conveyor 52. Assuming that an article like husked ears of corn are being handled and that the orienting operation serves to distribute the ears in two rows extending along the sides of the conveyor 51, then in the operation of the apparatus the conveyor 52 is caused to receive two rows of the ears likewise located along the sides of the conveyor, and the two rows may be separately discharged upon additional conveying means which serves to move the ears to another processing machine, or machines, such as machines for cutting kernels from the ear. In FIG. 6 the ears are shown being delivered from the sides of the conveyor 52 over the upper edge of plate 73 and upon two laterally extending chain conveyors 91. The chain conveyors extend in opposite directions for supplying two corn-cutting machines in the manner illustrated in FIGS. 11 and 12 of said U.S. Pat. No. 3,394,805.

As explained in connection with the previously described embodiment, the first conveyor 51 is driven at a speed substantially greater than the speed of movement of the second conveyor 52. Thus conveyor 51 can be driven at a speed such as 260 flights per minute, whereas the conveyor 52 can be driven at the speed of 130 flights per minute. Drive connections from suitable power means such as an electric motor may be made to any one of the sprockets of the two conveyors. The shafts for the various sprockets are suitably journaled and carried by portions of the machine frame 92. Between the sprockets 65 and 68, the adjacent portions of the two conveyors move downwardly with the pockets coming into article-transferring registry.

Overall operation of the apparatus shown in FIG. 6 is as follows. Articles such as husked ears of corn are supplied at a nonuniform rate by the conveyor 74. This supply may be from a previous processing machine such as one which removes the husks from the corn. The corn ears are supplied to the hopper 77 and thus positioned in the pockets of the conveyor 51. As the ears are carried about the sprockets 63 to the top run of the conveyor 51, they are first engaged with the upper run of belt 86 whereby the ear in each pocket is moved to one side of the conveyor and any excess ears removed. This action is shown in schematic FIG. 7. At that time the ears do not have endwise orientation. In other words, some of the ears have their smaller ends pointing in one direction, and the other ears have their smaller ends pointing in the opposite direction. As the ears are now advanced to engage the upper run of the underlying belt 89, they are caused to be rotated about their axes, and as a result they are caused to move toward one side or the other of the conveyor 51, as illustrated in FIG. 7. Due both to the inability of the hopper 77 to feed ears of corn into each pocket, and also due to the orienting action in which the ears are redistributed into two rows, the oriented rows will be nonuniform. The transfer of ears between the conveyors 51 and 52 in the transfer region between the sprockets 65 and 68 takes place as previously described in connection with FIG. 1, except that transfer occurs with respect to both side portions of the conveyors whereby each of the pockets of the conveyor 52 receives two oppositely oriented ears of corn. Thus the delivery of ears by the conveyor 52 is not only at a uniform rate, but in addition two ears at a time are delivered to feed the two cross conveyors 84. Thus corn cutting machines which may be supplied by the conveyors 84 will be fed at uniform optimum rate.

Under certain operating conditions, the number of articles supplied to the transfer region may be in excess of that required to supply the requisite number of articles to the second conveyor 52. Under such circumstances some articles will be dropped from the pockets of the conveyor 51 immediately below the sprocket 68, and any such articles fall into hopper 77. Thus excess articles are returned to the conveyor 51 and eventually returned to the transfer region.

In general it will be evident that the apparatus shown in FIG. 6 constitutes a novel combination between orienting means for orienting articles into two nonuniform rows disposed along the sides of the conveyor 41, and means performing a transfer and accumulating function which will serve to supply two rows of the articles to processing operations at a uniform rate. Thus orienting machines of the type described in Ross et al. 3,394,805 can be operated at a much higher capacity, and the corn cutting machines or other processing machines being supplied may be fed at a uniform rate consistent with best economy.

Schematic FIG. 7 represents the functioning parts of FIG. 6 extended as a development. Ears of corn 1 are being fed in random fashion to the right hand end of fast moving conveyor 51. As the ears are moved over the cross belt 86 which moves all of the ears to one side, excess ears are removed through dropout opening 87. Endless belt 89 orients the ears whereby two rows are formed, one on each side of the conveyor. The transfer accumulator 96 performs the functions previously described whereby the slower moving conveyor 52 is supplied with two ears in each pocket to form two rows. These rows are fed to conveyors 91 which deliver the ears at a uniform rate to corn cutting machines.

Although particular reference has been made to the handling of elongated tapered agricultural products such as husked ears of sweet corn, it will be evident that the method and apparatus can be used for a wide variety of articles, including cans, jars, plastic containers, and the like. In the handling of all such articles, physical injury is minimized because of the absence of impacts or severe rubbing action during the transfer operation. The force of gravity, in moving articles from one conveying means to the pockets of the adjacent conveying means, can be controlled by the angle to which the conveying means are inclined in the transfer region. Rounded articles are particularly suitable for handling with the method and apparatus because such articles more readily move from one pocket to another, and because rounded surfaces minimize the possibility of jamming.

It is anticipated that with most apparatus the two conveyors will be operated continuously. However, in some instances it may be desirable to use incremental or step-by-step movement. In such instances it is desirable to operate the conveyor 51 continuously and the other conveyor 52 step by step in increments consistent with good transfer action.

I claim:

1. A method for the handling of articles of comparable size supplied at a nonuniform rate, the method making use of first and second conveying means each having a plurality of successive pockets and with each pocket adapted to accommodate an article, the two conveying means having paths of movement including path portions that are in juxtaposition in a transfer region, the articles being supplied to the pockets of the first conveying means at a nonuniform rate whereby some but not all of such pockets contain articles, the steps of concurrently progressing the pockets of both said conveying means through the transfer region with the pockets of the first conveying means moving at a speed greater than the pockets of the second conveying means, causing articles from the first conveying means to be transferred in a random fashion to empty pockets in the second conveying means in said transfer region, the overall rate of transfer being such that each of the pockets of the second conveying means leaving said transfer region is supplied with an article, the transfer of articles taking place at various points and in a random fashion along the paths of movement of the first and second conveying means in said transfer region.

2. A method as in claim 1 in which the pockets of the two conveying means in the transfer region are recurrently brought into registration with articles being transferred from pockets of the first conveying means to empty pockets of the second conveying means.

3. A method as in claim 1 in which the articles being handled are elongated in length with rounded surfaces.

4. A method as in claim 2 in which the articles are caused to be transferred by gravity from the pockets of the first conveying means to empty pockets of the second conveying means.

5. A method as in claim 2 in which the transfer region is of the length in the direction of conveying movement of the first and second conveying means such that at any one time each conveying means has a plurality of pockets progressing through said transfer region.

6. A method as in claim 5 in which the direction of conveying movement of the pockets through said region is along adjacent paths that are inclined to the vertical whereby articles are caused to move by gravity from the pockets of the first conveying means to empty pockets of the second conveying means.

7. A method as in claim 1 in which the articles are tapered and in which they are oriented into at least two rows before progressing into the transfer region.

8. In apparatus for the handling of articles of comparable size supplied to the apparatus at a nonuniform rate, first and second conveying means, each conveying means comprising a plurality of successive pockets with each pocket dimensioned to accommodate an article, the conveying means having paths of conveying movement that are in juxtaposition through a transfer region, the first conveying means being adapted to receive said articles as supplied at a nonuniform rate whereby some of the pockets of the first conveying means but not all of such pockets are supplied with articles, driving means for the first and second conveying means serving to drive the first conveying means to move the same through said transfer region at a speed substantially greater than the speed of movement of the second conveying means through the transfer region, the disposition and paths of movement of the pockets of the two conveying means in said transfer region being such that in said region articles are transferred from pockets of the first conveying means to empty pockets of the second conveying means.

9. Apparatus as in claim 8 together with means for collecting articles supplied by the first conveying means in excess of the number required to fill the pockets of the second conveying means in the transfer region.

10. Apparatus as in claim 8 in which the paths of movement of the two conveying means through said region are so disposed with respect to each other whereby articles are caused to move by gravity from pockets of the first conveying means into empty pockets of the second conveying means.

11. Apparatus as in claim 10 in which the paths of movements of the two conveying means in said transfer region are inclined to the vertical whereby items are caused to move by gravity from pockets of the first conveying means into empty pockets of the second conveying means.

12. Apparatus as in claim 8 in which the two conveying means are so constructed that the pockets of the same are elongated and extend laterally of the direction of conveying movement, said pockets being adapted to receive elongated items, the pockets of the first conveying means in said transfer region extending substantially parallel to the pockets of the second conveying means.

13. Apparatus as in claim 8 in which each of the conveying means is of the endless chain or belt type, each conveying means including parallel flights forming article-receiving pockets between the same, the flights of the two conveying means in said transfer region moving along proximate paths, the clearance between the paths of movement of the flights of the two conveying means in said transfer region being substantially less than the spacing between adjacent flights.

14. Apparatus as in claim 8 in which the conveying means comprises two wheels or discs, each having article-receiving pockets.

15. Apparatus as in claim 13 together with means for orienting the articles into tow rows in the first conveying means whereby two uniform rows of articles are delivered by the second conveying means.